(12) United States Patent
Lin (10) Patent No.: US 8,808,552 B2
(45) Date of Patent: Aug. 19, 2014

(54) STACKABLE FILTER CUP APPARATUS AND METHOD

(75) Inventor: Zhenwu Lin, Bellevue, WA (US)

(73) Assignee: ZenPure (Hangzhou) Co., Ltd. (CN)

( * ) Notice: Subject to any disclaimer, the term of this patent is extended or adjusted under 35 U.S.C. 154(b) by 670 days.

(21) Appl. No.: 12/969,612

(22) Filed: Dec. 16, 2010

(65) Prior Publication Data

US 2012/0152865 A1 Jun. 21, 2012

(51) Int. Cl.
| B01D 37/00 | (2006.01) |
| B01D 35/00 | (2006.01) |
| B01D 29/01 | (2006.01) |
| B01D 29/05 | (2006.01) |

(52) U.S. Cl.
USPC ........... 210/808; 210/232; 210/256; 210/258; 210/291; 210/337; 210/339; 210/406; 210/455; 210/489; 210/502.1; 210/694; 210/474; 422/534; 422/535

(58) Field of Classification Search
None
See application file for complete search history.

(56) References Cited

U.S. PATENT DOCUMENTS

| 316,885 | A | * | 4/1885 | Dumont | 210/284 |
| 323,637 | A | * | 8/1885 | Connolly | 210/300 |
| 347,581 | A | * | 8/1886 | Dodge | 210/337 |
| 426,489 | A | * | 4/1890 | Connolly | 210/337 |
| 433,659 | A | * | 8/1890 | Schermerhorn | 210/315 |
| 604,984 | A | * | 5/1898 | Harder | 210/318 |
| 881,564 | A | * | 3/1908 | Epstein | 210/337 |
| 895,446 | A | * | 8/1908 | Forssman | 100/125 |
| 942,121 | A | * | 12/1909 | White | 210/314 |
| 950,211 | A | * | 2/1910 | Reymore et al. | 210/314 |
| 967,905 | A | * | 8/1910 | Hagg | 210/301 |
| 989,752 | A | * | 4/1911 | Ansley | 210/318 |
| 1,023,664 | A | * | 4/1912 | Laity | 210/337 |
| 1,027,623 | A | * | 5/1912 | Molloy | 210/337 |
| 1,044,074 | A | * | 11/1912 | Nugent | 210/329 |
| 1,053,573 | A | * | 2/1913 | Clemm | 210/315 |
| 1,064,243 | A | * | 6/1913 | Naegelen et al. | 210/335 |
| 1,068,900 | A | * | 7/1913 | Herd | 210/470 |
| 1,104,773 | A | * | 7/1914 | Bradshaw | 210/318 |
| 1,216,112 | A | * | 2/1917 | Greven | 210/477 |
| 1,239,975 | A | * | 9/1917 | Signor | 210/337 |
| 1,430,636 | A | * | 10/1922 | Forgeson | 209/357 |
| 1,501,073 | A | * | 7/1924 | Stead | 210/478 |
| 1,536,890 | A | * | 5/1925 | Lagemann | 210/249 |
| 1,576,735 | A | * | 3/1926 | Fessenden | 426/77 |
| 1,859,904 | A | * | 5/1932 | Wichmann | 422/159 |
| 1,889,111 | A | * | 11/1932 | Serr | 206/217 |
| 2,003,658 | A | * | 6/1935 | Thomas | 210/318 |
| 2,136,170 | A | * | 11/1938 | Luertzing | 210/94 |
| 2,138,256 | A | * | 11/1938 | Schuyler | 210/243 |
| 2,197,435 | A | * | 4/1940 | Niemeyer | 209/403 |

(Continued)

OTHER PUBLICATIONS

Author—unknown, Soil Growing Tomatoes on Mars, Date—unknown, www.tomatosphere.org/teacher-resourees/teachers-guide/grades-2-4/soil.cfm (pp. 1-4).

*Primary Examiner* — Robert James Popovics (74) *Attorney, Agent, or Firm* — Lorusso & Associates (57) ABSTRACT

An apparatus and method to perform multiple filtration steps with a modular filtration apparatus and single cycle. A stackable modular filter cup has features to allow stacked cups to be separated without the need for substantial effort yet without diminishing the effect of vacuum assisted filtration. Each cup is formed with a slip seal segment and/or a series of substantially vertical channels or ridges on an inner or outer wall to reduce surface contact between nested filter cups.

22 Claims, 4 Drawing Sheets

(56) References Cited

U.S. PATENT DOCUMENTS

| | | | |
|---|---|---|---|
| 2,202,055 A * | 5/1940 | Juffa | 210/336 |
| 2,204,158 A * | 6/1940 | Serio et al. | 99/310 |
| 2,334,802 A * | 11/1943 | Zuckermann | 210/335 |
| 2,379,101 A * | 6/1945 | Post | 210/455 |
| 2,409,226 A * | 10/1946 | Schlumbohm | 99/302 R |
| 2,449,238 A * | 9/1948 | Lightfoot, Jr | 210/232 |
| 2,738,914 A * | 3/1956 | Hatch | 229/406 |
| 2,743,664 A * | 5/1956 | Dale | 99/295 |
| 2,879,917 A * | 3/1959 | Flack | 206/519 |
| 2,899,310 A * | 8/1959 | Dale | 99/295 |
| 2,915,176 A * | 12/1959 | O'Neil | 426/86 |
| 3,010,583 A * | 11/1961 | Kenyon | 210/406 |
| 3,047,153 A * | 7/1962 | Zelinski | 209/408 |
| 3,083,101 A * | 3/1963 | Noury | 99/295 |
| 3,295,686 A * | 1/1967 | Krueger | 210/455 |
| 3,339,743 A * | 9/1967 | Bealle | 210/256 |
| 3,358,879 A * | 12/1967 | Mueller | 206/519 |
| 3,386,580 A * | 6/1968 | Grabarczyk | 209/237 |
| 3,387,553 A * | 6/1968 | Tavera | 99/295 |
| 3,443,697 A | 5/1969 | Seggebruch | |
| 3,445,237 A * | 5/1969 | Gidge | 426/77 |
| 3,446,624 A * | 5/1969 | Luedtke | 426/77 |
| 3,478,889 A * | 11/1969 | Fessler | 210/406 |
| 3,512,677 A * | 5/1970 | Kovac | 206/520 |
| 3,526,316 A * | 9/1970 | Kalogris | 206/217 |
| 3,669,001 A * | 6/1972 | Asen | 426/86 |
| 3,800,943 A * | 4/1974 | Riesbeck et al. | 209/237 |
| 3,822,013 A * | 7/1974 | Van Der Veken | 206/0.5 |
| 3,831,753 A * | 8/1974 | Gaylord et al. | 209/399 |
| 3,838,978 A * | 10/1974 | Eddleman et al. | 422/535 |
| 3,927,766 A * | 12/1975 | Day | 206/519 |
| 3,935,318 A * | 1/1976 | Mihailide | 426/80 |
| 3,971,305 A * | 7/1976 | Daswick | 99/295 |
| 4,021,354 A * | 5/1977 | Lyon | 210/477 |
| 4,052,163 A * | 10/1977 | Patzner | 422/534 |
| 4,096,947 A * | 6/1978 | Morse | 206/519 |
| 4,124,120 A * | 11/1978 | Day | 206/519 |
| 4,146,481 A | 3/1979 | Nagatoshi et al. | 210/232 |
| 4,156,483 A * | 5/1979 | Day | 206/217 |
| 4,199,442 A * | 4/1980 | Popow | 209/408 |
| 4,251,366 A * | 2/1981 | Simon et al. | 210/767 |
| 4,301,010 A * | 11/1981 | Eddleman et al. | 210/406 |
| 4,357,240 A * | 11/1982 | Mehra et al. | 210/455 |
| 4,368,818 A * | 1/1983 | Day et al. | 206/217 |
| 4,371,436 A * | 2/1983 | Farber | 209/268 |
| 4,417,504 A * | 11/1983 | Yamamoto | 99/306 |
| 4,439,319 A * | 3/1984 | Rock | 210/238 |
| 4,523,934 A * | 6/1985 | Joshua | 96/193 |
| 4,550,024 A * | 10/1985 | le Granse | 426/77 |
| 4,557,902 A * | 12/1985 | Mussmann | 422/413 |
| 4,614,585 A * | 9/1986 | Mehra et al. | 210/321.84 |
| 4,632,755 A | 12/1986 | DeGraffenried | 210/314 |
| 4,636,361 A * | 1/1987 | Marian et al. | 422/533 |
| 4,673,501 A * | 6/1987 | Wells et al. | 210/474 |
| 4,678,576 A * | 7/1987 | Leoncavallo | 210/321.87 |
| 4,689,147 A * | 8/1987 | Leoncavallo et al. | 210/232 |
| 4,691,732 A * | 9/1987 | Johnson et al. | 137/268 |
| 4,702,834 A * | 10/1987 | Relyea | 210/321.78 |
| 4,721,567 A * | 1/1988 | Uram | 210/489 |
| 4,731,177 A * | 3/1988 | Hemman | 210/86 |
| 4,765,896 A * | 8/1988 | Hartley et al. | 210/474 |
| 4,783,318 A * | 11/1988 | Lapakko | 422/534 |
| 4,792,398 A * | 12/1988 | Klein | 210/406 |
| 4,804,470 A * | 2/1989 | Calvillo et al. | 210/232 |
| 4,816,148 A * | 3/1989 | Hemman | 210/256 |
| 4,849,061 A * | 7/1989 | Relyea | 156/308.4 |
| 4,867,993 A * | 9/1989 | Nordskog | 426/77 |
| 5,026,477 A * | 6/1991 | Yen | 210/167.25 |
| 5,108,768 A * | 4/1992 | So | 426/77 |
| 5,139,747 A | 8/1992 | Cato et al. | 422/122 |
| 5,143,219 A * | 9/1992 | Yates, Jr. | 206/508 |
| 5,186,828 A * | 2/1993 | Mankin | 210/232 |
| 5,192,424 A * | 3/1993 | Beyne et al. | 210/85 |
| 5,215,657 A * | 6/1993 | Goldfield et al. | 210/321.64 |
| 5,234,585 A * | 8/1993 | Zuk, Jr. | 210/188 |
| 5,242,589 A * | 9/1993 | Kuo et al. | 210/264 |
| 5,243,164 A * | 9/1993 | Erickson et al. | 219/689 |
| D341,992 S * | 12/1993 | Gasser | D7/400 |
| 5,308,483 A * | 5/1994 | Sklar et al. | 210/232 |
| 5,325,765 A * | 7/1994 | Sylvan et al. | 99/295 |
| 5,368,169 A * | 11/1994 | Ensor | 209/403 |
| 5,375,477 A * | 12/1994 | Neill et al. | 73/863.23 |
| 5,389,253 A * | 2/1995 | Cicconi | 210/248 |
| 5,407,567 A * | 4/1995 | Newhard | 210/198.1 |
| 5,409,603 A * | 4/1995 | Tsung | 210/233 |
| 5,411,661 A * | 5/1995 | Heiligman | 210/264 |
| 5,417,855 A * | 5/1995 | Gershenson | 210/315 |
| 5,424,083 A * | 6/1995 | Lozito | 426/82 |
| 5,447,079 A * | 9/1995 | Neill et al. | 73/863.23 |
| 5,453,184 A * | 9/1995 | Handtmann | 210/193 |
| 5,472,600 A * | 12/1995 | Ellefson et al. | 210/317 |
| 5,523,235 A * | 6/1996 | Barditch et al. | 435/291.3 |
| 5,590,581 A * | 1/1997 | Strub et al. | 99/302 R |
| 5,595,910 A * | 1/1997 | Kant et al. | 435/289.1 |
| 5,601,711 A * | 2/1997 | Sklar et al. | 210/238 |
| 5,603,900 A * | 2/1997 | Clark et al. | 422/535 |
| 5,652,008 A * | 7/1997 | Heiligman | 426/422 |
| 5,653,271 A * | 8/1997 | Brittain et al. | 141/98 |
| 5,695,639 A * | 12/1997 | Johnson | 210/474 |
| 5,738,786 A * | 4/1998 | Winnington-Ingram | 210/474 |
| 5,759,501 A * | 6/1998 | Livingston et al. | 422/275 |
| 5,792,356 A * | 8/1998 | Yuan | 210/473 |
| 5,792,425 A * | 8/1998 | Clark et al. | 422/535 |
| 5,853,581 A * | 12/1998 | Rayborn et al. | 210/241 |
| 5,873,967 A * | 2/1999 | Clark et al. | 156/70 |
| 5,914,036 A * | 6/1999 | Sullivan, Jr. | 210/232 |
| 5,914,045 A * | 6/1999 | Palmer et al. | 210/694 |
| 5,935,435 A * | 8/1999 | Hasler | 210/232 |
| 5,948,246 A * | 9/1999 | Zuk, Jr. | 210/188 |
| 5,952,028 A * | 9/1999 | Lesser | 426/433 |
| 6,007,788 A * | 12/1999 | Bellon et al. | 422/264 |
| 6,038,963 A * | 3/2000 | Patterson et al. | 99/287 |
| 6,095,033 A * | 8/2000 | Melton | 99/323.3 |
| 6,117,391 A * | 9/2000 | Mootz et al. | 422/65 |
| 6,161,470 A * | 12/2000 | Justus | 99/319 |
| 6,227,401 B1 * | 5/2001 | Rowland et al. | 220/571.1 |
| 6,254,772 B1 * | 7/2001 | Chau | 210/278 |
| 6,274,055 B1 * | 8/2001 | Zuk, Jr. | 210/767 |
| 6,277,648 B1 * | 8/2001 | Colpan | 436/177 |
| 6,358,730 B1 * | 3/2002 | Kane | 435/297.5 |
| 6,443,314 B2 * | 9/2002 | Shiraiwa et al. | 210/474 |
| 6,458,278 B1 * | 10/2002 | Leoncavallo et al. | 210/650 |
| 6,475,270 B1 * | 11/2002 | Graeve | 96/135 |
| 6,482,358 B1 * | 11/2002 | Kelsch et al. | 422/28 |
| 6,537,448 B2 * | 3/2003 | Houk | 210/164 |
| 6,609,618 B2 * | 8/2003 | Colpan | 210/489 |
| 6,645,537 B2 * | 11/2003 | Sweeney et al. | 426/79 |
| 6,669,844 B2 | 12/2003 | Strohm et al. | 210/224 |
| 6,692,639 B1 * | 2/2004 | Spearman et al. | 210/323.2 |
| 6,770,203 B2 * | 8/2004 | Leoncavallo et al. | 210/650 |
| 6,777,007 B2 * | 8/2004 | Cai | 426/78 |
| 6,844,015 B2 * | 1/2005 | Yuguchi | 426/78 |
| 6,846,412 B2 * | 1/2005 | Hogan et al. | 210/227 |
| 6,881,380 B1 * | 4/2005 | Mootz et al. | 422/65 |
| 6,887,379 B2 * | 5/2005 | Schiltz | 210/266 |
| 6,913,152 B2 * | 7/2005 | Zuk, Jr. | 210/406 |
| 6,916,423 B2 * | 7/2005 | Bogoev et al. | 210/634 |
| 6,925,857 B2 * | 8/2005 | Weber et al. | 73/64.54 |
| 6,932,899 B2 * | 8/2005 | Bonelli et al. | 210/85 |
| 7,011,755 B2 * | 3/2006 | Zuk, Jr. | 210/416.1 |
| 7,014,829 B2 * | 3/2006 | Yanagisawa et al. | 423/447.1 |
| 7,033,499 B2 * | 4/2006 | Cohee et al. | 210/321.75 |
| 7,093,530 B2 * | 8/2006 | Meister et al. | 99/295 |
| 7,168,572 B2 * | 1/2007 | Nguyen et al. | 210/457 |
| 7,240,572 B2 * | 7/2007 | Pitt et al. | 73/863.21 |
| 7,389,720 B2 * | 6/2008 | Haverstock | 99/297 |
| 7,407,632 B2 * | 8/2008 | Ross | 422/120 |
| 7,413,649 B2 * | 8/2008 | Bittner | 210/108 |
| 7,540,232 B2 * | 6/2009 | Bates et al. | 99/295 |
| 7,546,779 B2 * | 6/2009 | Pitt et al. | 73/863.21 |
| 7,661,538 B1 * | 2/2010 | Zuk, Jr. | 210/416.1 |
| 7,798,333 B2 * | 9/2010 | Zuk, Jr. | 210/406 |
| 7,997,423 B2 * | 8/2011 | Goodman et al. | 210/473 |
| 8,002,973 B2 * | 8/2011 | Jacobs et al. | 210/85 |

(56) References Cited

U.S. PATENT DOCUMENTS

| | | | |
|---|---|---|---|
| 8,039,036 B2 * | 10/2011 | Knitel et al. | 426/595 |
| 8,157,104 B2 * | 4/2012 | Kane et al. | 210/406 |
| 8,158,009 B2 * | 4/2012 | Kane et al. | 210/739 |
| 8,231,012 B2 * | 7/2012 | Kane et al. | 210/406 |
| 8,235,221 B2 * | 8/2012 | Taylor et al. | 210/406 |
| 8,318,011 B2 * | 11/2012 | O'Brien et al. | 210/200 |
| 8,342,337 B1 * | 1/2013 | Genovese et al. | 210/348 |
| 8,474,368 B2 * | 7/2013 | Kilber et al. | 99/295 |
| 8,505,440 B2 * | 8/2013 | Kirschner et al. | 99/295 |
| 8,636,151 B2 * | 1/2014 | Duval et al. | 210/436 |
| 2001/0008218 A1 * | 7/2001 | Chau | 210/278 |
| 2001/0052491 A1 * | 12/2001 | Shiraiwa et al. | 210/321.6 |
| 2002/0040872 A1 * | 4/2002 | Bogoev et al. | 210/634 |
| 2002/0070151 A1 * | 6/2002 | Houk | 210/163 |
| 2002/0096468 A1 * | 7/2002 | Zuk, Jr. | 210/455 |
| 2002/0113007 A1 * | 8/2002 | Chiodo | 210/497.01 |
| 2003/0010708 A1 * | 1/2003 | Leocavallo et al. | 210/477 |
| 2003/0080045 A1 * | 5/2003 | Zuk, Jr. | 210/416.1 |
| 2003/0189002 A1 * | 10/2003 | Proulx et al. | 210/284 |
| 2004/0045895 A1 * | 3/2004 | Bonelli et al. | 210/497.1 |
| 2005/0139091 A1 * | 6/2005 | Haverstock | 99/495 |
| 2005/0189288 A1 * | 9/2005 | Hershberger et al. | 210/448 |
| 2005/0189290 A1 * | 9/2005 | Maiden | 210/473 |
| 2005/0265903 A1 * | 12/2005 | Ross | 422/120 |
| 2006/0237355 A1 * | 10/2006 | Knapp | 210/323.1 |
| 2007/0264167 A1 * | 11/2007 | Warner | 422/104 |
| 2007/0289271 A1 * | 12/2007 | Justice et al. | 55/495 |
| 2007/0289272 A1 * | 12/2007 | Justice | 55/495 |
| 2007/0289274 A1 * | 12/2007 | Justice et al. | 55/511 |
| 2008/0245237 A1 * | 10/2008 | Haverstock | 99/297 |
| 2009/0032454 A1 * | 2/2009 | Rapparini | 210/337 |
| 2009/0294385 A1 * | 12/2009 | Tajima et al. | 210/808 |
| 2009/0314703 A1 * | 12/2009 | Beach et al. | 210/232 |
| 2010/0224078 A1 * | 9/2010 | Khalifa | 99/323 |
| 2010/0320134 A1 * | 12/2010 | Zuk, Jr. | 210/232 |
| 2011/0271845 A1 * | 11/2011 | Lee | 99/295 |
| 2011/0284442 A1 * | 11/2011 | Williams | 210/170.09 |
| 2012/0152865 A1 * | 6/2012 | Lin | 210/808 |
| 2012/0241369 A1 * | 9/2012 | McLane | 210/301 |

* cited by examiner

STACKABLE FILTER CUP APPARATUS AND METHOD

FIELD OF THE INVENTION

The invention relates to filter cups used to separate solids from liquids. More particularly, the invention concerns apparatus and methods to mechanically separate solids dissolved in liquids through multiple filtration steps with a single pour of a fluid into a stacked column of stackable filter cups, each having a dedicated filter for filtering solids from liquids.

BACKGROUND OF THE INVENTION

To perform filtrations of solutions (fluids or gases containing suspended solids) bearing multiple forms of solids having different particle sizes and solubility constants, and/or complex solids, filtration systems, particularly those that employ vacuum assisted filtration, use a rather laborious and time consuming manual procedure of introducing a solution into a filter cup having a porous barrier, i.e., a filter, to retain particles of a desired size (solute) and allow passage of a solvent (filtrate) component. Often times, the desired solid cannot be separated and isolated without the use of multiple filtration operations that may require a multitude of reagents to break down the solution components and multiple filter media to obtain the desired solid.

With conventional gravimetric, or vacuum-assisted filtration systems, a series of filters have to be used to achieve the desired result. For example, as shown in U.S. Pat. No. 5,695,639, a modular filter system is shown that includes a spout member designed to direct a solvent into a container. A top portion of the spout is configured to receive in releasable engagement, a reservoir element, or modular filter cup.

To secure a filter to the apparatus, the filter is sandwiched between the tight fitting, but releasable reservoir and spout. To perform a multi-step filtration process with this apparatus, each filtration operation requires the reservoir and spout to be disassembled and the filter carefully removed and replaced with a different filter for the next step. If sterility of the solute is important to the procedure, a sterile implement, e.g., forceps, may have to be used to remove the filter.

The fluid portion that flows via the spout into a container, e.g., a flask, is reintroduced into the reservoir to begin another filtration cycle. The steps are repeated serially until the desired solid(s) has been separated out of the solution. The process is slow and cumbersome due to the structure of the filter cup/filter/stem assembly.

In U.S. Pat. No. 4,301,010, a multi-component vacuum filter funnel is disclosed that solves the problem of solids migrating around the perimeter of filters placed in filter cups. The apparatus includes a vacuum intake member (similar to a filter cup stem) that creates a seal between the filter cup assembly and a container, such as a flask. An optional funnel having a spout is placed within the intake member and forms an airtight seal with the intake member. The spout extends beyond a bottom outlet of the intake member. An upper funnel member (filter cup) having a perforated plate formed on a bottom has threading on an outer lower end that engages threading on an upper inner perimeter edge of the intake member.

A filter is placed on the perforated plate to perform the filtration function. A threaded cylindrical sleeve member has threading formed around an outside bottom edge of the member that engages corresponding threading on a lower end of an inner wall of the upper funnel member. The engaged features of the sleeve member and upper funnel member secure the filter firmly against the perforated plate, particularly about the filter's perimeter edge. This configuration ensures a tight seal of the filter's edge to prohibit the migration of solids around the filter's edge.

While solving the problem of solute migration around the filter, this configuration is enormously cumbersome when a multi-step filtration process is required. Each change of a filter requires the sleeve member to be rotated out of the upper funnel member and the upper funnel member to be rotated out of the intake member to enable retrieval of the filter. This assembly and disassembly process has to be repeated for each successive filter.

As gravimetric and vacuum-assisted filtration processes often require multiple filtration steps, achieving this by multiple exchanges of filter cups with changed filters may cause additional problems with respect to solute loss and material contamination. Each problem can adversely affect quantitative as well as qualitative analyses.

The process of stacking conventional filter cups is equally problematic as the registered walls of stacked cups result in too much surface area contact. With the addition of vacuum assisted filtration, the binding of nested cups is increased making separation potentially very difficult due to the negative pressure coupled with likely capillary action of fluid migrating into the interface of adjacent cups.

What is needed and desired is a filter cup apparatus that simplifies and streamlines multi-step filtration processes including pre-filtration and final filtration steps by providing a filter train to prevent or eliminate solute loss and contamination, and that provides a means to facilitate separation of nested cups to retrieve desired solutes. These and other objects of the invention will become apparent from a reading of the following summary and detailed description of the invention.

SUMMARY OF THE INVENTION

In one aspect of the invention, an apparatus for performing multiple filtration steps in a single pour includes two or more stacked filter cups having features for facilitating the releasable engagement of nested cups. An inner wall, and/or an outer wall, of each cup is formed with one or more substantially vertical or helical grooves, or, alternatively, ribs to prevent unwanted adhesion of the interfacing side walls.

A substantially annular lower portion of the inner wall of each cup is formed with a frustum angle different than the angle of an upper portion of the wall. This allows the lower portion to register against the outer wall of an adjacent second filter cup placed nested within the first filter cup to form a luer lock type slip seal without engaging the upper portion. This reduces the overall contact of the nested walls to reduce overall adhesion between the nested cups. This dramatically reduces the amount of energy needed to separate the cups and retrieve the desired solute(s) when the filtration process is complete.

A bottom surface of each cup has portions defining an annular shoulder to receive and secure an o-ring seal between the cup and a stem. The stem has portions defining an annular chase into which the o-ring is secured. This creates an airtight and fluid-tight seal between the filter cup and stem. The bottom edge of the annular shoulder acts as a stop when the cup is nested inside another filter cup.

In another aspect of the invention, an annular ledge is formed on the inner wall of each cup that acts as a stop when a second filter cup is inserted into the filter cup. The annular shoulder of the second filter cup registers against the ledge so as to define a space between the filters of the two cups. This ensures to formation of an adequate space to contain the desired precipitate without the precipitate coming into contact with, and potentially clinging to, a bottom surface of the second nested filter cup.

DETAILED DESCRIPTION OF THE INVENTION

Referring to FIGS. 1-3, 7 and 10, in one aspect of the invention, a stackable filter cup assembly, shown generally as 10, includes a stackable filter cup subassembly 12 configured substantially as an inverted frustum of a cone with a top end having a diameter generally greater than a bottom end to which a filter material is attached. Filter cup subassembly 12 is secured to a filter stem 14 that has features for securing the filter cup assembly to a container, such as a flask. Filter cup subassembly 12 may be constructed from materials (disclosed below) suitable for disposal after one or more uses.

Filter cup 12 has a substantially circular bottom edge. A lower portion 21 of a sidewall of the cup forms an annular shoulder 16 for receiving a top end of filter stem 14. Formed on an inner wall of cup 12 is an annular flange 18 that provides a binding/connection point for a filter membrane 19. The combination of flange 18 and shoulder 16 form a cavity into which filter stem 14 is seated.

Figure 1:
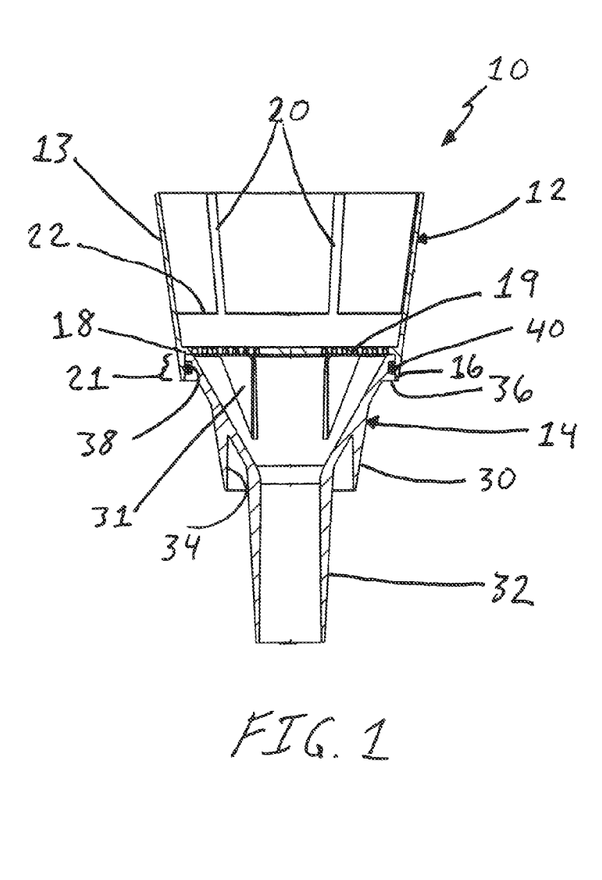
FIG. 1 is a sectional view of a stackable filter cup and filter assembly according to one embodiment of the disclosure.
Figures 2, 3:
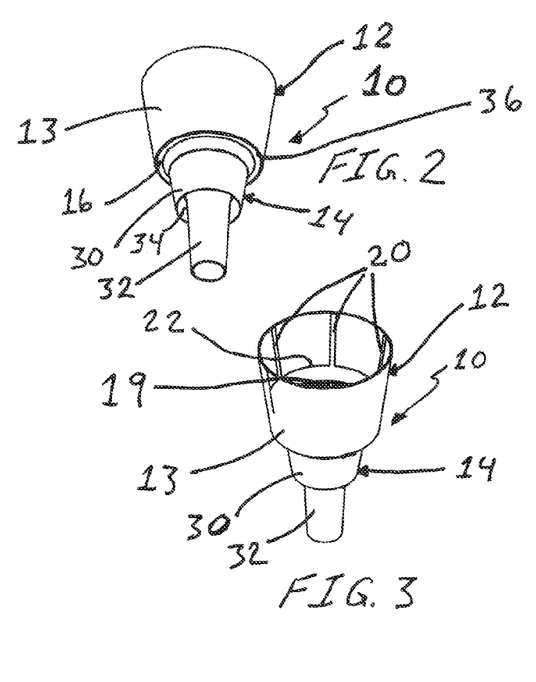
FIG. 2 is a bottom perspective view of a stackable filter cup assembly according to another embodiment of the disclosure.
FIG. 3 is a top perspective view of a stackable filter cup assembly according to another embodiment of the disclosure.
Figures 4, 5, 6:
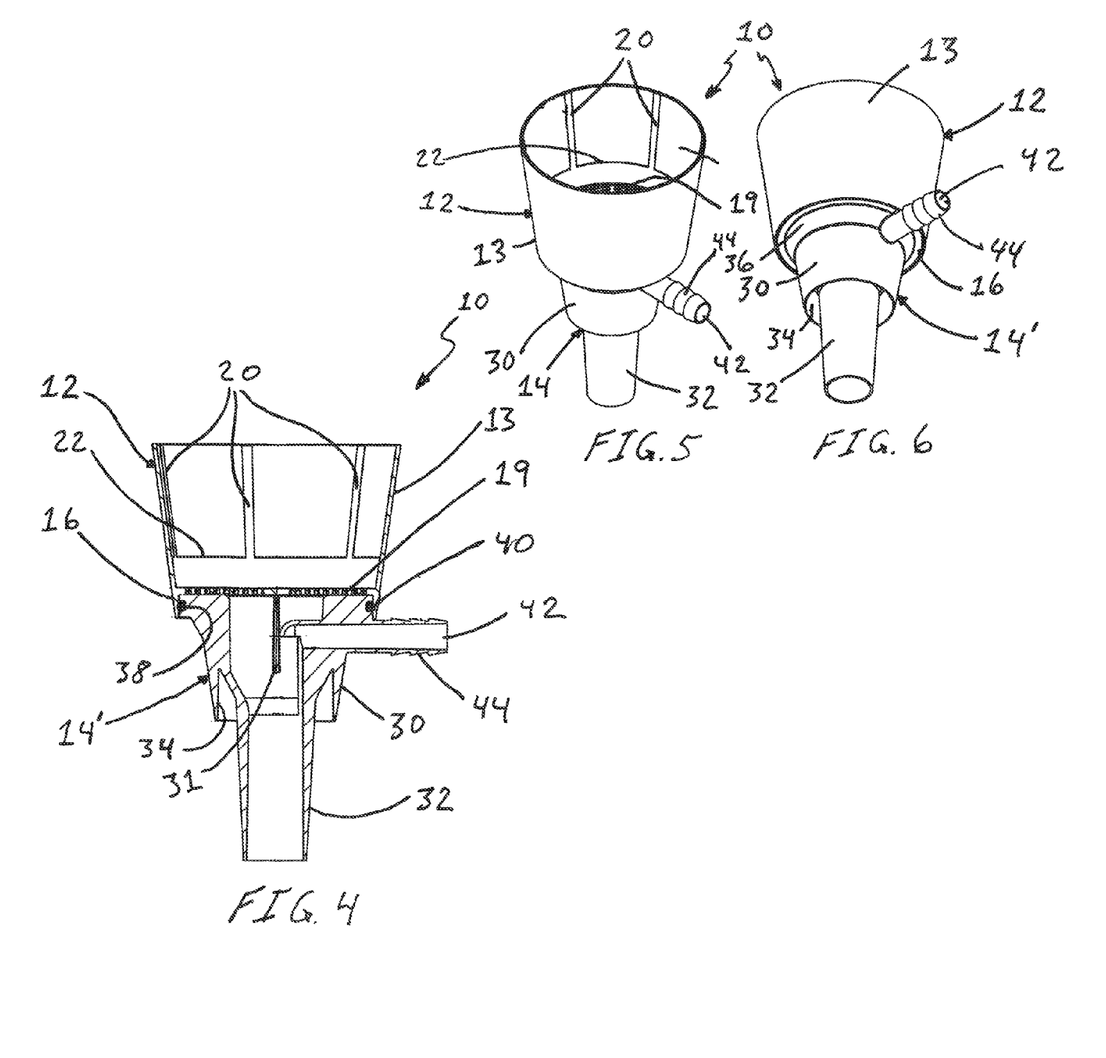
FIG. 4 is a sectional view of a stackable filter cup assembly according to another embodiment of the disclosure.
FIG. 5 is a top perspective view of a stackable filter cup assembly according to another embodiment of the disclosure.
FIG. 6 is a bottom perspective view of a stackable filter cup assembly according to another embodiment of the disclosure.

Formed on an inner wall of cup sub-assembly 12 are a plurality of release channels or grooves 20. In one embodiment, channels 20 run substantially vertically from a top end of the cup to a termination point 22 set above the plane occupied by the filter membrane disclosed below. The distance between termination point 22 and the filter membrane provides an area 23 for solutes to accumulate during a filtration process. This distance can be increased or decreased to alter the available volume for solute precipitation.

Alternatively, channels 20 may extend to a point proximate to, but not congruent with, the plane occupied by the top end of the cup. In a further alternative embodiment, channels 20 may define a spiral pattern along the cup inner wall. The starting point of each spiral channel 20 may coincide with the plane occupied by termination point 22. Channels 20 may conform to other configurations as long as the channels are not oriented substantially horizontally within cup 12. This ensures any trapped air and/or fluid will be channeled away from the adjoining surfaces of two cups when urged into a nested configuration.

In a further aspect of the disclosure, channels 20 may be formed on an outer wall of cup subassembly 12. The orientation and length of channels 20 formed on the outer wall may be the same as disclosed for channels 20 formed on the inner wall. In a yet further aspect of the disclosure, channels 20 may be formed on both the inner wall and outer wall of cup subassembly 12 to maximize friction and/or capillary action reduction when two or more cups are nested together.

In an alternate embodiment, a plurality of ribs or ridges 20' may be formed on the inner wall, or outer wall of cup subassembly 12 to perform the same function as release channels 20. For purposes of this disclosure, a rib or ridge is defined as a segment of inner or outer cup wall, either integral or attached, extending proud of the general inner or outer wall surface and with a width less than the width of an inner or outer wall segment extending between adjacent ribs or ridges.

Like channels 20, ribs 20' limit surface area contact between nested filter cups so as to reduce any adhesion caused by friction and/or capillary action of fluids introduced into the filter cups. Ribs 20' may be oriented substantially vertically within or without cup 12, may define a helical pattern, or may conform to other configurations so long as the ribs are not oriented substantially horizontally within cup 12. The gap formed between nested cups can be altered by altering the thickness of the ribs. The thicker the ribs, the shorter the distance a cup can be nested into a lower cup and the larger the gap between nested cup filters.

With this embodiment, it should be understood that the number and width of the ribs will impact the effectiveness of vacuum assist. If a significantly large area of the walls of nested cups is maintained separate so as to form gaps, a substantial portion of the negative vacuum pressure may be lost between the gaps between the nested walls without the presence of the slip seal disclosed and described below.

Secured to annular flange 18 is filter membrane 19. Membrane 19 may be made of any material suitable for use as a filtering medium including, but not limited to, woven screens made from nylon, polyester, polypropylene and stainless steel, cellulose fiber, activated carbon fibers, melt-blown micro-fiber and nano-fiber non-woven filter media made from polypropylene, nylon, polyvinylidene fluoride (PVDF), glass-fibers, nanoporous or microporous polymer-based membranes made from polytetrafluoro-ethylene (Teflon® PTFE), polyvinylidene fluoride (PVDF), perfluoroalkoxy (PFA), Ethylene-clorotrifluoroethylene copolymer (ECTFE), polyolefins like polypropylene (PP), high density polyethylene (HDPE), ultra high molecular weight polyethylene (UHMWPE or UPE), polyethersulfone (PES), polysulfone (PS), Nylon 6, Nylon 66, regenerated cellulose, mixed esters of cellulose, polycarbonate, polyester, and mixtures thereof.

The filtration media's retention feature and pore size can be altered over a wide range of values to accommodate different filtration applications. In addition, the membranes or filtration media can be made with functional surface properties to have absorption, adsorption, and/or ion exchange sites for specific filtration and purification requirements. The pore sizes on the filter media can range from about 0.001 micron up to about 100 micron, depending on the target application and/or the size of the particle or molecule to be removed.

The functional surfaces may be discrete portions of the filter, or the entire filter having anionic or cationic sites to adsorb charged molecules in the passing solution. For example, adsorbents for heavy metals are available in powder form, or porous disc form. In porous disc form, the specialized discs may be used in place of, or in combination with, resident filters in the filter cups. If used as a supplemental filter means, the specialized discs may be placed on, or adhered to, the resident filter.

Membrane 19 may be bonded to flange 18 via sonic bonding, thermal lamination, chemical bonding, adhesive, press-fit, and the like. The membrane or filter media can also be secured to flange 18 by insert molding. The type of bonding may be varied to accommodate any possible reaction to the contents of a fluid to be filtrated.

In a further aspect of the disclosure, a slip seal segment 26 (shown in FIG. 8) formed on a lower end of the cup inner wall is set at an angle relative to the plane occupied by filter 19 and flange 18 different than the angle formed by the remainder of the cup wall with the same plane. The angle of segment 26 is less than the angle of the remainder of the cup wall when measured in terms of degrees of angle.

Figures 7, 8, 9:
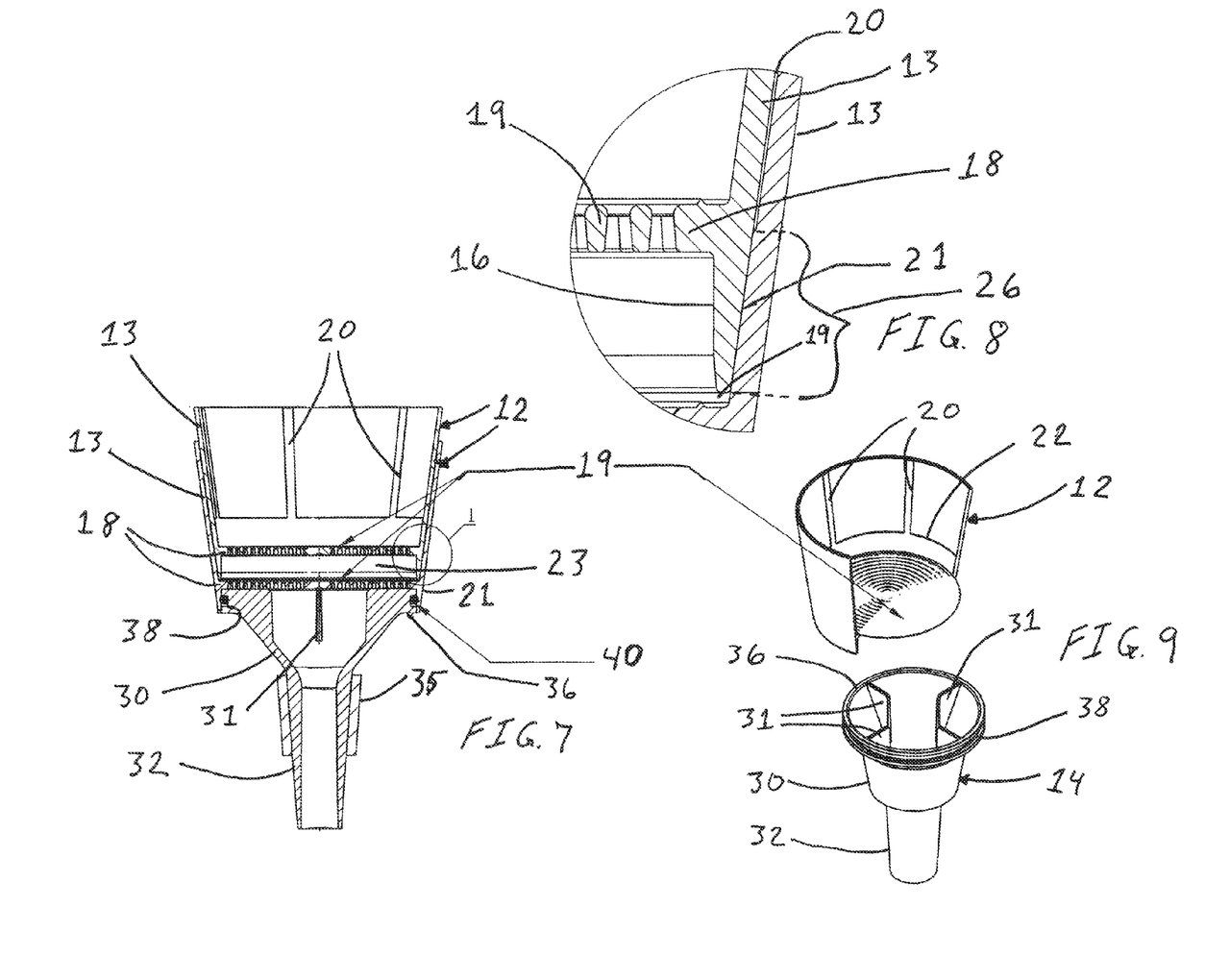
FIG. 7 is a sectional view of a stackable filter cup assembly with an additional stacked up according to one embodiment of the disclosure.
FIG. 8 is a partial sectional view taken at I in FIG. 7 showing the registration surfaces of nested filter cups according to one embodiment of the disclosure.
FIG. 9 is an exploded view of a stackable filter cup assembly according to one embodiment of the disclosure.
Figures 10, 11:
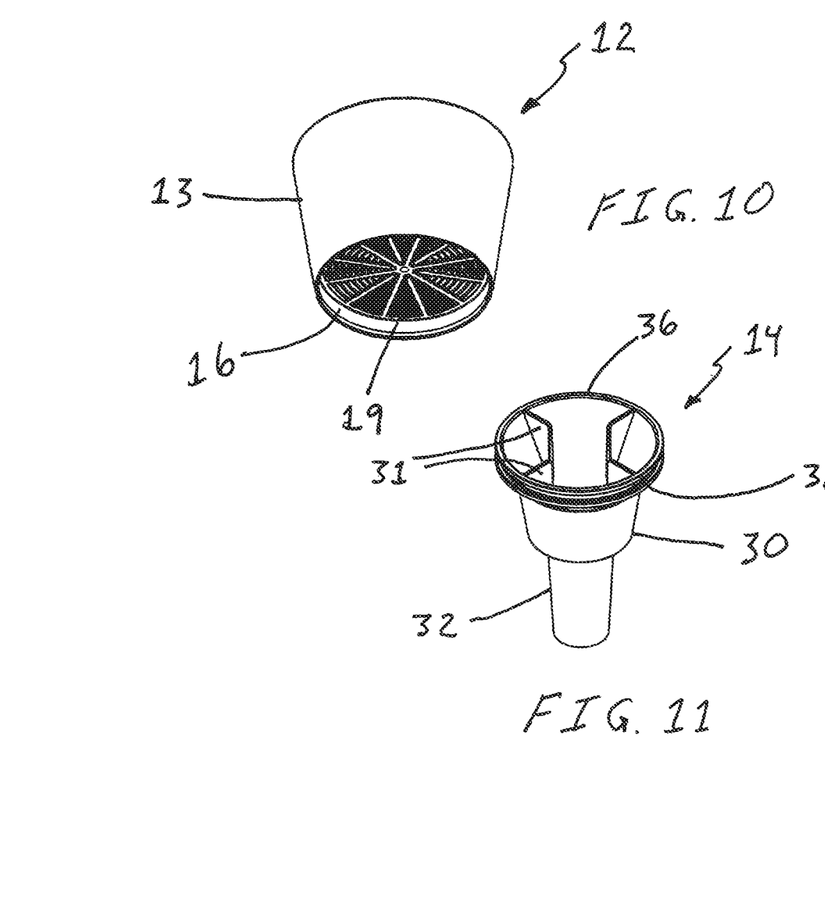
FIG. 10 is a bottom perspective view of a stackable filter cup according to one embodiment of the disclosure.
FIG. 11 is a top perspective view of a stackable filter cup stem according to one embodiment of the disclosure.
Figure 12:
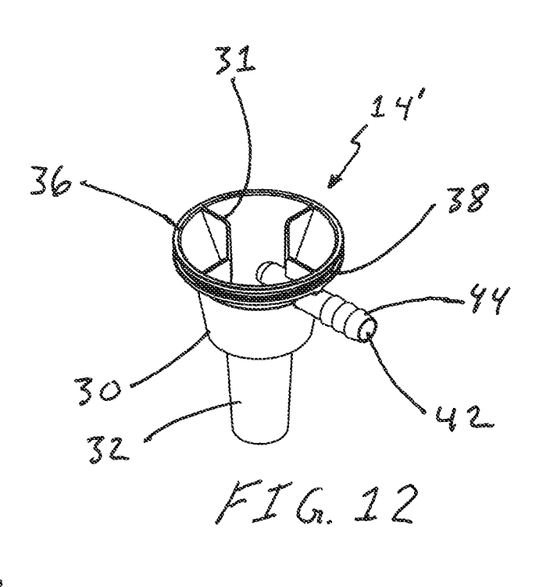
FIG. 12 is a top perspective view of a stackable filter cup stem according to another embodiment of the disclosure.

By making the angle of segment 26 less than the angle of the upper portion of the cup wall, the amount of cup wall registering with an adjacent nested cup can be controlled and limited by the length of segment 26.

With respect to the embodiment utilizing ribs 20', a top annular end of segment 26 should align with the inward faces of ribs 20' to ensure contact with the corresponding outer slip seal surface segment 21 of another cup nested therein. Segment 21 does not require modification when ribs 20' are used.

To create a uniform slip seal, an outer surface of corresponding wall segment 21 is formed at an angle relative to the plane occupied by flange 18 and filter 19 substantially similar to the angle formed by segment 26. In one embodiment, the difference between the angle of segment 26 and the remainder of the cup wall can be from an angle greater than about 0° to an angle of about 15°. An angle from about 4° to about 8° provides a superior slip seal surface suitable for securely nesting cups and releasing nested cups. It should be understood that angles outside this stated range may also provide an adequate slip seal surface.

In another aspect of the disclosure, referring now to FIGS. 1, 2, 9 and 11, filter stem 14 includes a main body 30 defining a hollow interior for receiving fluid. Main body 30 may be formed with one or more trusses 31 to add structural rigidity and to support filter 19. Main body 30 is connected to, and in fluid communication with, either a modular or integral spout 32 extending downwardly from main body 30. Spout 32 may be substantially uniformly cylindrical along its length, or may be formed with a tapered wall with the lower end of the spout having a diameter smaller than the diameter of the spout portion proximate main body 30. Spout 32 is substantially hollow throughout its length to allow fluid to flow therethrough from main body 30.

In one embodiment, a bottom end of main body 30 has portions defining an annular channel 34 configured to receive an open top end of a fluid receiving vessel, e.g., a flask. The spout end proximal to main body 30 tapers outwardly towards body 30 and defines an inner wall of channel 34. Due to the taper of the upper spout end, the diameter of channel 34 becomes smaller as the channel walls progress to an upper terminus. This configuration ensures the engagement with numerous fluid receiving vessels having variable neck sizes and results in a seal sufficiently tight to support the introduction of vacuum assistance to facilitate fluid flow through the filter system.

In an alternate embodiment, main body 30 does not have portions defining channel 34. Instead, a stopper 35 having a through bore configured to receive spout 32 is placed onto spout 32 to create a seal with the spout.

An outer wall of stopper 35 may have an upwardly extending taper to create a seal with a fluid receiving vessel when the filter apparatus is placed onto the vessel. The outer wall may be varied in both diameter and taper to accommodate a wide range of receiving vessel necks. Stopper 35 may be integral to spout 32, or may be a separate component as disclosed and described above.

Extending from a top end of main body 30 is an annular filter cup receiving segment 36. Receiving segment 36 is dimensioned to fit within circular shoulder 16 so as to provide a substantially air-tight connection with filter cup 12. Formed on a perimeter of receiving segment 36 is o-ring channel 38. Channel 38 is configured to receive an o-ring 40. O-ring 40 interfaces with channel 38 and an inside wall of shoulder 16 to provide an air-tight seal between filter cup 12 and stem 14. This configuration also allows ease of disassembly of the cup and stem due to the lubricious nature of the materials used to construct o-rings.

O-ring 40 may be constructed from a variety of materials including, but not limited to silicone, nitrile, neoprene, ethylene propylene (EPM or EPDM), fluorocarbon, perfluoroelastomers, and combinations thereof. Regardless of the material used for o-ring 40, it should be understood that channel 38 may alternatively be formed on an inner wall of shoulder 16. In a yet further alternative, o-ring channels may be formed on both the inner wall of shoulder 16 and the perimeter of receiving segment 36 to receive o-ring 40.

In a further aspect of the invention as shown in FIGS. 4-6 and 12, stem 14 may be formed with a vacuum stem 42 to receive a hose to supply vacuum pressure to the filtration apparatus in the event the fluid receiving vessel is not provided with a vacuum assist nozzle. Vacuum stem 42 may further be formed with integral hose barbs 44 to secure an attached vacuum hose (not shown). Barbs 44 are preferably configured to prevent unintended migration of the hose off the vacuum stem. Other fittings can also be used, such as male/female quick couplings that provide a quick release feature for easy attachment and separation of the filtration system from the vacuum hose.

To use the novel filter apparatus, a stem/filter cup assembly (as shown in FIG. 1, is assembled and placed on a fluid receiving vessel so that either channel 34 or stopper 35 register against the receiving vessel to form a substantially air-tight seal. Next, one or more additional filter cups are placed onto the initial assembly to form a series of nested filter cups wherein a space is formed between the filters of each cup as shown in FIG. 7.

Additional filtration media, such as activated carbon fiber media, or molecular selective resin or chromatographic media can be placed in the space between the nested cups to facilitate and achieve highly selective separation and/or purification processes. The added filtration medium may be adhered to the structures of the nested cups, or may be free floating and contained by the defined inter-cup space. If free floating, the added filtration media is inserted onto the filter surface of a first filter cup and secured in place when a second filter cup is inserted into and nested with the first filter cup. As with filter 19, the additional filtration medium may be customized with respect to retention features and pore sizes, and optionally formed with functional surface properties as disclosed with respect to the description of filter 19.

Each cup should have a different filter (different media, filter pore size), to capture different precipitates, although one or more cups may have the same filter characteristics in terms of retention features and pore size, among others. If vacuum assistance is desired or required, vacuum pressure is introduced via the vacuum stem or via a vacuum stem formed or placed on the receiving vessel. The user then pours the subject liquid into the uppermost filter cup along with any reagents and allows the gravimetric and/or vacuum assisted filtration process to run its course through the successive filter cups.

When the fluid has completed its passage through each filter cup with the filtrate being deposited in the receiving vessel, the cups are removed one from another by applying opposing forces to adjacent nested cups with hands or grasping implements, e.g., forceps. Whether ridges or channels are used to construct the cups, the cups should disengage with relative ease as there will be insufficient surface area contact to impede cup separation. Once the desired precipitate has been removed from filter cup 14 (and any additional filter cups in the filter cup train), using methods commonly known in the art, e.g. scraping, back washing, flushing and/or dissolutions, the filter cup may be disposed or cleaned for subsequent use.

Material selection for the filter cups and stem and filter type and pore size selection is determined by the acceptable or required bulk flow of fluid and retention of precipitate through the apparatus. Ideally, the material selected should be able to withstand emersion into strong solvents, acids, bases, and potentially oxidizing fluids, and should be able to withstand the high temperatures of autoclave (135° C.) and other sterilizing equipment, e.g., gamma e-beam. Polysulphones, polyethylene, nylon, PVDF (polyvinylidene fluoride (e.g., Kynar Flex®)), gamma stabilized PP (polypropylene), and/or combinations thereof are well suited for these functions.

While the present invention has been described in connection with several embodiments thereof, it will be apparent to those skilled in the art that many changes and modifications may be made without departing from the true spirit and scope of the present invention. Accordingly, it is intended by the appended claims to cover all such changes and modifications as come within the true spirit and scope of the invention.

What I claim as new and desire to secure by United States Letters Patent is:

1. A stacked column filtration assembly comprising:
    a plurality of stackable filter cups each having a sidewall wherein a bottom end of the sidewall has portions defining an annular flange for receiving a filter;
    a dedicated filter secured to the flange of each filter cup for filtering solids from liquids, each cup being sized and shaped to nestingly receive another of the plurality of cups, wherein a substantially annular lower portion of the sidewall of each cup defines a slip seal segment, wherein the lower portion is formed with a frustum angle different than the angle of an upper portion of the sidewall, thereby allowing the lower portion of each cup when functioning as a lower cup to register against the outer surface of a sidewall of an adjacent upper filter cup nested in the lower cup, each filter cup having a plurality of ribs or grooves formed on either the outer surface of the sidewall or on the inner surface of the sidewall to substantially prevent adhesion of engaging walls of the plurality of cups when nested, wherein a lower portion of the sidewall of each cup forms an annular shoulder; and,
    a filter stem having an open top end which is securely received by the annular shoulder of a lowermost filter cup, the stem including a main body defining a hollow interior for receiving fluid.

2. The apparatus of claim 1 wherein the ribs or grooves are oriented substantially vertically on each filter cup inner wall, or oriented substantially vertically on each filter cup outer wall.

3. The apparatus of claim 1 wherein the slip seal segment is angled relative to a vertical axis of each filter cup from greater than 0° to about 15°.

4. The apparatus of claim 3 wherein a top edge of the slip seal segment forms an annular shoulder extending outwardly from each filter cup inner wall.

5. The apparatus of claim 1 wherein the filter stem further comprises a substantially hollow spout extending downwardly from the main body, and a top filter cup receiving segment extending upwardly from the main body, wherein the hollow interior of the main body is in fluid communication with an open chamber defined by the spout.

6. The apparatus of claim 5 wherein the filter stem further defines an annular channel formed by portions of the main body for receiving a fluid receiving vessel.

7. The apparatus of claim 6 wherein each filter cup receiving segment has portions defining an O-ring channel about a perimeter edge.

8. The apparatus of claim 7 further comprising an O-ring secured in the O-ring channel.

9. The apparatus of claim 5 wherein the filter stem main body comprises at least one truss extending from an inner wall of the filter stem.

10. The apparatus of claim 5 wherein the filter stem main body comprises a plurality of trusses extending from an inner wall of the filter stem.

11. The apparatus of claim 5 further comprising a stopper having a through-bore wherein the stopper is superposed about the spout via the through-bore.

12. The apparatus of claim 1 wherein each filter further comprises functional surface areas to perform adsorption filtration and purification functions.

13. The apparatus of claim 12 further comprising at least one additional filtration medium selected from the group consisting of activated carbon fiber media, molecular selective resin, chromatographic media, or combinations thereof.

14. The apparatus of claim 13 wherein the additional filtration medium is positioned unsecured on the filter.

15. The apparatus of claim 13 wherein the additional filtration medium further comprises functional surface areas to perform adsorption filtration and purification functions.

16. The apparatus of claim 13 wherein the additional filtration media is adhered to the structures of the filtration cup.

17. The apparatus of claim 1 wherein the plurality of ribs or grooves are substantially helically shaped.

18. The apparatus of claim 1 wherein the filter stem has portions defining a vacuum stem.

19. The apparatus of claim 18 wherein the vacuum stem includes barbs.

20. A method of filtering fluids to retrieve multiple precipitates comprising the steps of:
    providing a plurality of filter cups according to claim 1;
    placing the filter cups in a stacked configuration by nesting each successive cup in a bottom cup or a previously nested cup so as to form a slip seal between registering surfaces and gaps between adjacent filters secured to each of the plurality of cups;
    securing the stacked cups to the filter stem to form the stacked column filtration assembly;
    securing the stacked column filtration assembly to a fluid receiving vessel; and,
    pouring a selected fluid into the upper most stacked filter cup.

21. The method of claim 20 further comprising the step of applying vacuum pressure to the stacked column filtration assembly.

22. The method of claim 20 further comprising providing an additional filtration medium and positioning the medium in at least one gap formed by the filters of nested cups.

* * * * *